Aug. 30, 1966

C. E. ADAMS 3,269,416

CONTROL VALVE MECHANISM WITH MEANS FOR
REDUCING HYDRAULIC SHOCK

Filed May 25, 1964

INVENTOR.
Cecil E. Adams
BY
Wood, Herron and Evans
ATTORNEYS

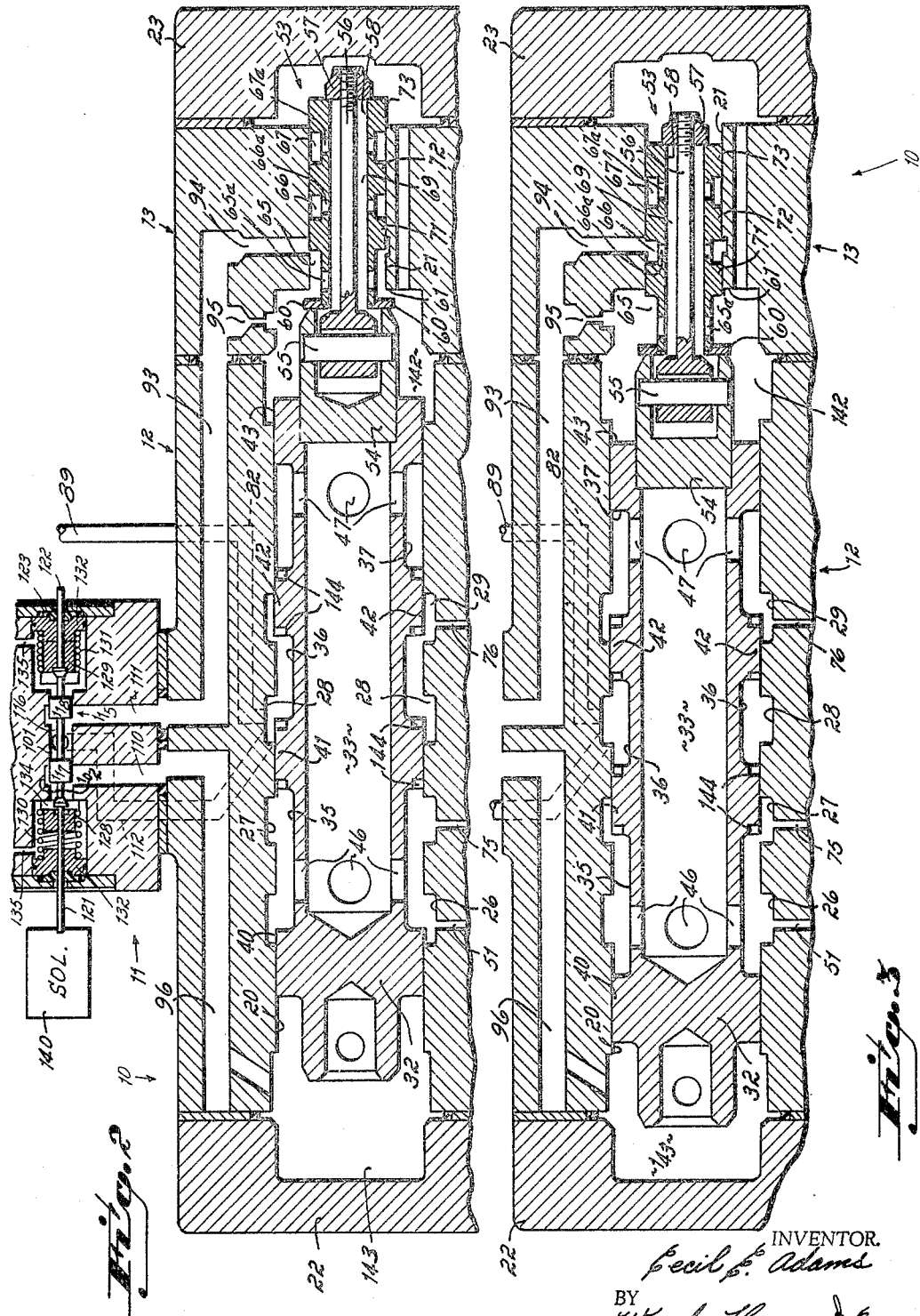

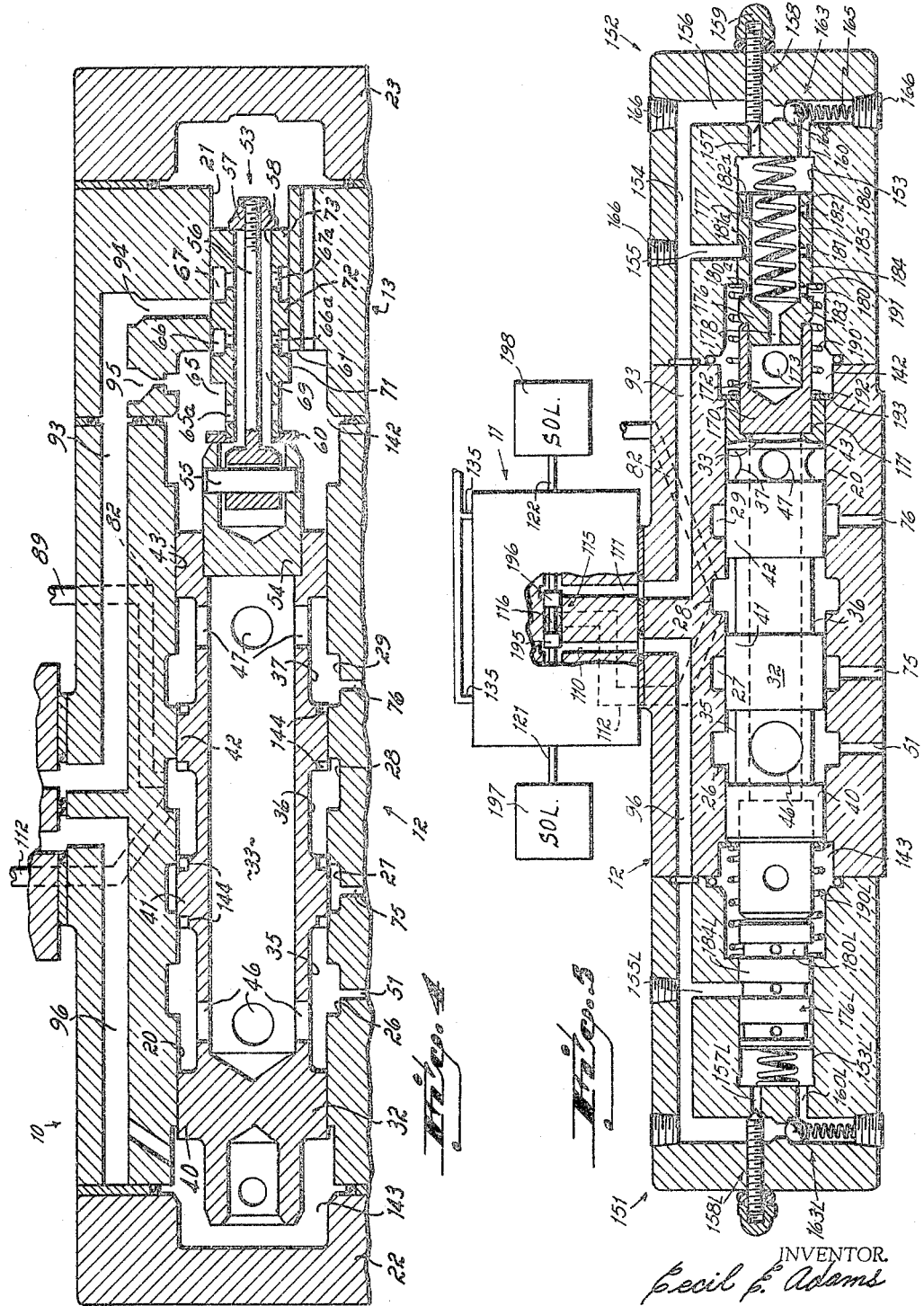

United States Patent Office 3,269,416
Patented August 30, 1966

3,269,416
CONTROL VALVE MECHANISM WITH MEANS FOR REDUCING HYDRAULIC SHOCK
Cecil E. Adams, Columbus, Ohio, assignor to American Brake Shoe Company, New York, N.Y., a corporation of Delaware
Filed May 25, 1964, Ser. No. 369,891
13 Claims. (Cl. 137—625.63)

This invention relates to improvements in hydraulically operated control valve mechanisms whereby there is substantially avoided or greatly reduced the hydraulic shock which usually accompanies the rapid opening or closing of a work or outlet port of the valve to the flow of fluid.

Hydraulic valves of the type to which this invention relates are commonly known as "two-way," "three-way," "four-way," etc. valves, and they may include a main spool which is shiftable in a bore to direct flow from a pressure inlet port to one or more work or outlet ports. Such valves are used in a wide variety of applications, for example, to direct hydraulic liquid flow to and from a fluid motor to control the operation and/or direction of operation of the motor.

It has been a principal objective of this invention to provide improved hydraulic motor means which may be employed for example in conjunction with a valve of the shiftable spool type to shift the spool in such manner as to gradually and smoothly start and stop a fluid motor controlled by the valve.

It will be recognized that when the spool of such a valve is shifted rapidly from an off position to start the flow of fluid in an external circuit, a violent hydraulic shock can arise in the hydraulic system in response to the sudden application of fluid under pressure to a motor which is then at rest. The motor initially tends to block completely the flow of fluid, thereby causing a shock to occur in the system. This shock is similar to the well-known phenomenon of water hammer, and it may also occur upon sudden closure of the valve.

Such sudden increases in hydraulic pressure place undue strain upon every portion of the system, and cause the motor controlled by the valve to be set in motion almost instantaneously at maximum horsepower output. These conditions are highly undesirable; in addition to overloading parts of the hydraulic system, they have been known to cause the mechanism including the motor to be set in motion with a jerk of sufficient violence as to break the machinery.

With the objective of overcoming these very serious problems, I have invented means whereby the movable means of the valve, for example, the spool in a spool type valve, is caused to move slowly while it is closing or opening the outlet or load port, and such that the spool is caused to travel at a faster rate before closing a port, or while traversing between ports, or after the ports have been sufficiently opened to high pressure fluid in the system.

In accordance with a preferred form of this invention, such control of the rate of travel of the spool of a spool valve is effected by hydraulic motor means whereby hydraulic liquid is introduced into or released from a control chamber in which it acts on a control surface of the spool to position the spool, at rates depending upon the position of the spool with respect to the outlet ports. Valve means responsive to the position of the spool permit greater flow rates into or out of the control chamber when the ports are open or closed than when they are being opened or closed. The main spool thus moves relatively slowly when first opening and finally closing an outlet port in comparison to a higher or rapid traverse rate of movement at all other times.

The invention can best be further described by reference to the accompanying drawings in which:

FIGURE 2 is an axial sectional view of the valve mechanism shown in FIGURE 1 but showing the mechanism with the control solenoid energized and the main valve spool beginning to move toward the left;

FIGURE 3 is a sectional view similar to FIGURE 2 but showing the main valve spool moved farther to the left;

FIGURE 3 is a sectional view similar to FIGURE 2 but showing the main valve spool moved farther to the left;

FIGURE 4 is a sectional view similar to FIGURES 2 and 3 but showing the main valve spool moved still farther to the left, and FIGURE 5 shows a double solenoid controlled inching type four-way valve incorporating the invention in a different form whereby flow through the valve may be started and stopped at any time to "inch" the operation of the motor which it is connected to control.

Figure 1:
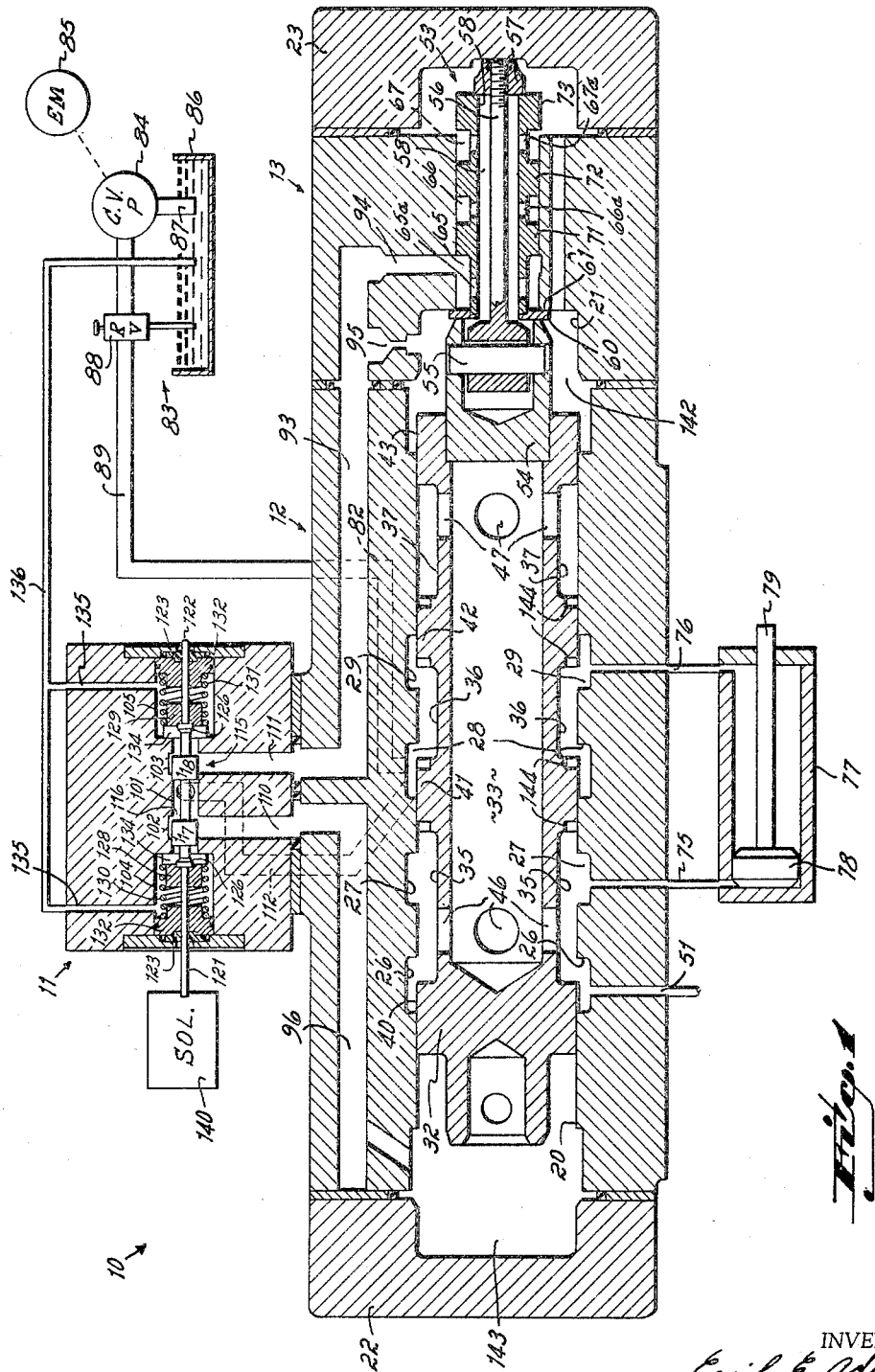
FIGURE 1 is a diagrammatic view of a hydraulic circuit for operating a hydraulic motor, the view also showing a hydraulic pilot operated valve including the features of the invention, the valve mechanism being shown in axial section.

This invention may be embodied in valves of different structure, such, for example, as rotary valves, but it is herein described in connection with a spool valve. With reference to FIGURES 1–4 of the drawings, a single solenoid controlled four-way valve mechanism embodying the invention is designated generally at 10. The body of valve 10 comprises an assembly of three elements or sections 11, 12, and 13. As will be described more fully, body section 11 contains structure forming a pilot valve, section 12 contains the main valve mechanism, the direction of flow through which is controlled by the pilot valve, and section 13 contains speed control mechanism whereby the rate of movement of the movable valve member or spool of the main valve is controlled.

Body section 12 has a longitudinal bore 20 which is co-axial and communicates with a stepped bore 21 in the body section 13 secured to one end of section 12. The bores 20 and 21 are closed at their opposite ends by end caps 22 and 23 respectively.

Bore 20 is provided with longitudinally spaced circumferential grooves or ports 26, 27, 28, and 29, and it contains a movable main valve element or spool 32 which is positionable axially in the bore 20 at different flow directing positions therein.

The main spool 32 has an internal bore or chamber 33. Spool 32 is provided with three circumferential grooves 35, 36, and 37, defining lands 40, 41, 42, and 43. The lands 40–43 are finished to form sliding seals with bore 20. Ports 46 and 47 provide communication between the chamber 33 in spool 32 and grooves 35 and 37 respectively.

In the typical use of valve 10 in a hydraulic circuit, as shown in FIGURE 1 of the drawings, groove 26 of the body section 12 is conencted to a fluid reservoir or tank 86 through a port 51. The chamber 33 in spool 32 is also in constant communication with tank 86 through spool ports 46, groove 35, groove 26, and port 51.

A hollow speed or flow control spool valve element 53 is attached to the right end (with reference to FIGURES 1–4) of main spool 32. Specifically, spool 53 is connected to a plug 54 which closes the right end of the chamber 33 in spool 32. Spool 53 has an internal axial bore 58. A connecting link 56 passes through this bore 58, the link 56 having a lock nut 57 at its outer end which nut abuts the end face of spool 53. A transverse or diametral pin 55 in plug 54 positively connects link 56 to the plug, the link 56 being put in tension between pin 55 and nut 57 as the latter is tightened. A stop washer 60 is clamped between plug 54 and spool 53, and this washer 60 has a diameter such that it will engage a shoulder 61 in stepped bore 21 to limit the rightward movement of the spools 32 and 53. In FIGURE 1 spools 32 and 53 are shown in their extreme right position.

The outer surface of spool 53 is provided with three axially spaced circumferential grooves or ports 65, 66, and 67. Between these grooves and to the right of groove 65 are lands 71, 72, and 73 respectively. The grooves 65, 66, and 67 communicate with bore 58 of spool 53 through ports 65a, 66a, and 67a respectively.

The main body section 12 is provided with an externally opening port 75 communicating with groove 27, and is also provided with a port 76 communicating with groove 29. In the use of the valve 10 as herein shown, these ports 75 and 76 are connected in a hydraulic system to the ports of a reversible hydraulic motor. In FIGURE 1, for purposes of illustration, a typical reciprocating or ram type fluid motor 77 has been shown connected to ports 75 and 76. It is to be understood that hydraulic motors of other types may also be used. The motor 77 has a pressure operated piston 78 which is connected to a piston rod or ram 79. When pressure is supplied from port 75 of the valve 10 and port 76 is connected to a tank or reservoir, piston 78 will move to the right, and when pressure is supplied from port 76 and port 75 is connected to tank, piston 78 will move to the left, within its limits of movement.

A port or passage 82 in the main body section 12 communicates with groove 28 of bore 20, and in the circuit shown this port 82 is connected to a source of fluid under pressure such as is designated generally by 83 in FIGURE 1. Pressure source 83 may comprise a pump 84 driven by an electric motor 85 and which receives fluid from a tank 86 through a line 87. The outlet port of pump 84 is connected to port 82 through a relief valve 88 and a line 89. The low pressure or outlet side of relief valve 88 is returned to tank 86.

Body section 12 also has a port or passage 93 which communicates through a bore 94 in body section 13 with the axial bore 21 in which spool 53 slides. Bore 94 enters bore 21 at a location therein past which lands 71 and 72 move as the valve spool element 53 is shifted, whereby a valve action regulating the rate of flow into or out of control chamber 142 is established, as will be explained. Bore 94 communicates with groove 65 when the spool is at its extreme right position as shown in FIGURE 1. Port 93 communicates through a flow restrictor or orifice 95 with control chamber 142, which is the larger diameter portion of bore 21 to the left of shoulder 61, and with the right hand end of the main spool 32 in bore 20. Body section 12 also includes a port or passage 96 which communicates with bore 20 at the left hand end of spool 32.

The pilot valve body section 11 is preferably fastened to a side surface on the body section 12. Section 11 has a stepped pilot valve bore 101, which bore has two spaced circumferential grooves 102 and 103 and enlarged end chambers 104 and 105. Groove 102 of bore 101 communicates with port 96 of body section 12 through a passage 110, and groove 103 communicates with passage 93 of body section 12 through a passage 111. A passage 112 enters bore 101 approximately midway between grooves 102 and 103 and leads to groove 28 of bore 20 in the main body section 12 and thus is in constant communication with the pump outlet or pressure line 89 through passage 82.

Pilot bore 101 contains a movable pilot valve core or spool 115 which is provided with a central groove 116 flanked by lands 117 and 118. The width of groove 116 is equal to or just slightly less than the distance between the inner or adjacent edges of grooves 102 and 103. Spool 115 forms a sliding seal with bore 101 and when the spool 115 is in its normal position, as shown in FIGURE 1, land 118 isolates groove 103 from groove 102 and from groove 116 of spool 115 and from passage 112 which are in communication at all times with the source of fluid pressure 83. In the normal position of spool 115 groove 116 is open to or in communication with groove 102.

The pilot valve spool 115 is provided at its ends with operating shafts 121 and 122 which extend respectively through the end chambers 104 and 105 of bore 101. Shaft seals 123 close the ends of chambers 104 and 105 and form sliding seals with the operating shafts 121 and 122 which pass through the center of seals 123. The shaft seals are secured to body section 11 by suitable means not shown.

Each shaft 121 and 122 has a shoulder 126 formed on it, and each shoulder 126 outwardly abuts an axially slidable collar or disk 128 and 129. Compression springs 130 and 131 are located between end plugs 132 and the collars 128 and 129 respectively, and urge the collars 128 and 129 toward the center of bore 101 whereby the spool 115 is urged toward its normal position. Each collar 128 and 129 is provided with radial grooves or slots 134 which provide constant communication between the smaller diameter central part of bore 101 and the chambers 104 and 105. Passages 135 leading to chambers 104 and 105 are connected in use to a fluid reservoir or tank 86 by a line 136.

The left operating shaft 121 of pilot valve spool 115 is engaged by the armature, not shown in detail, of a solenoid 140. When the solenoid is energized its armature is moved to the right and thereby moves spool 115 to the right from the position shown in FIGURE 1 a distance such that land 117 closes groove 102 and passage 110, and land 118 opens groove 103 and passage 111 to fluid under pressure in groove 116.

When the solenoid 140 is de-energized and the source of pressure 83 is supplying pressure to groove 28 with the main spool 32 in the position shown in FIGURE 1, pressure is applied from groove 28 into groove 36 of the main spool 32 and through groove 29 of bore 20 to passage 76 and to the right side of piston 78 of the motor 77. The left side of piston 78 is connected to tank 86 through port 75, groove 27, groove 35, groove 26 and passage 51. Thus, pressure thereby holds the piston 78 in its leftmost position.

Fluid pressure in groove 28 is reflected through passage 112 into groove 116, and from groove 116 through passages 110 and 96 into the expansible chamber or motor means at the left end of the piston or spool 32 thus urging the spool to the right. The right end of spool 32 is in communication with tank 86 through bore 94 and orifice 95, passages 93 and 111, groove 103, bore 101, slot 134 and passages 135 and 136. Thus the spools 32 and 53 are held in the right position shown in FIGURE 1.

Movement of ram 79 to the right is initiated by energizing solenoid 140, which shifts the pilot valve spool 115 to the right, to the position shown in FIGURE 2. Fluid under pressure in groove 28 of body section 12 then flows through passageway 112 past land 118 into passage 111 and through bore 93 and restrictor 95 into the motor chamber 142 at the right of spool or piston 32. As stop washer 60 moves away from shoulder 61, fluid in bore 94 flows into the chamber 142 through groove 65 at a greater rate than the rate of flow through restrictor 95 by reason of the greater diameter of bore 94. The rate of flow through bore 94 may be several times greater than the flow rate through restrictor 95 at a given operating pressure and is additive thereto.

Movement of spool 115 to the position shown in FIGURE 2 closes passage 110 with respect to passage 112, and the fluid to the left of spool 32 is released to tank through passages 96, 110, groove 102, slot 134 and passage 135. The pressure acting on the right hand ends of spools 32 and 53 thereby moves them to the left.

The initial movement of spools 32 and 53 to the left is relatively rapid. However, when spool 53 has moved to approximately the position shown in FIGURE 2, in which the left edge of land 71 begins to close bore 94 to the flow of fluid therethrough, the rate at which fluid is introduced into chamber 142 to displace the spools farther to the left is limited by the restrictor 95, and consequently the rate of movement of the spools slows down as bore 94 is closed by land 71.

By reason of the relative positions of the grooves and lands, it will be seen that the rate of travel of spool 32 is rapid when the grooves 26 and 29 are open to the flow of fluid therethrough, and that land 71 begins to close off flow through bore 94 thereby reducing the rate of travel of spool 32 as the left edge of 42 approaches the left edge of groove 29 in the body section 12.

It should be noted that lands 41 and 42 of the spool 32 are provided with bleed slots or grooves 144 at both edges thereof; these bleed slots 144 establish more gradual closing or opening of the respective grooves as the lands move past the groove walls. Thus, as spool 32 continues to move to the left, at the then restricted rate, past the piston position shown in FIGURE 2, groove 29 of the body section 12 is closed by land 42 of the spool, thereby closing off port 76.

FIGURE 3 shows the relative positions of the main spool 32 and throttling spool 53 when the spools have moved still farther to the left, such that bore 94 is in communication with groove 66. When groove 66 first comes into communication with bore 94, fluid is supplied through that groove into bore 58 from bore 94 through the ports 66a, and fluid flows through ports 65a into control chamber 142. As groove 66 comes into full communication with bore 94, the flow of fluid into control chamber 142 through groove 66 again increases the rate of spool travel approximately to its initial rate. This increase occurs after land 42 has closed groove 29 to groove 36 and before land 41 has shifted to the left sufficiently for groove 27 to come into communication with groove 36, so that the higher rate persists while the main spool is shifting between ports 75 and 76.

The left side of land 72 begins to close off bore 94 as the bleed slots on the right edge of land 41 come into communication with groove 27, and pressure is then gradually applied to passage 75. As this occurs, the flow of fluid under pressure into line 75 will move piston 78 to the right, and fluid will be displaced from the right side of the piston through line 76 into groove 29, through ports 47 into the interior chamber 33 of spool 32, and through ports 46 to drain port 51.

FIGURE 4 illustrates the positions of spools 32 and 53 with respect to body sections 12 and 13 as groove 27 begins to be opened to groove 36 of spool 32. After groove 27 is substantially open, groove 67 comes into communciation with bore 94 and fluid is supplied more rapidly through port 67a into bore 58 and into control chamber 142 to cause the main spool to move more rapidly to the left. The spools continue to move rapidly to the left until spool 32 abuts end cap 22.

Pressure continues to be applied to groove 27 and the piston 78 continues to move to the right within its limits of movement until the solenoid 140 is de-energized and spool 115 is returned to normal position. When the latter occurs, passage 93 is connected to tank and pressure is applied to control chamber 143 at the left end of spool 32, thereby causing the spools to move to the right.

During movement of the spools to the right from extreme left position, pressure is applied to groove 27 until land 41 closes it, etc., in the reverse sequence from that previously described. The rate of spool travel again varies with the alternate opening and closing of bore 94.

It will be noted that in movement of spool 32 to the right, the rate of movement of the spool is controlled by the rate at which fluid is released from chamber 142 via bore 94 and/or restrictor 95.

From the foregoing it will be seen that spool 32 travels at a low rate while opening or closing either of the outlet ports 75 and 76 and at a faster rate when both ports are open or closed.

In a specilc embodiment of the valve structure shown, the total length of travel of valve spool 32 is 1⅜". The total length of the throttled or slow travel is ⅜", leaving the total length of rapid travel one inch. Expressed as a ratio, the distance traversed by the spool in rapid movement is 72.5% of the total length of the spool travel.

It should be noted that the pilot valve core or spool 115 can be operated mechanically or hydraulically or by other electrical means. Moreover, the valve 10 can be used to control the flow of fluids other than oil, e.g. pneumatic fluid.

The orifice 95 in body section 13 controls the rate of travel of the spool during the slow traverse periods of motion, and its size may be adjusted to provide a desired rate of slow travel. In practice, orifice 95 can be a needle valve capable of adjustment to provide different degrees of flow throttling.

In the mechanism shown in FIGURES 1–4 there is no provision of means to stop the ram 79 so as to cause it to dwell at a position intermediate its limits of movement. Upon energization of solenoid 140 the valve mechanism 10 will cause fluid to be supplied to the linear fluid motor 77 to fully extend the ram 79; de-energizing solenoid 140 before the ram has reached its limit of movement will connect bore 93 to tank and will apply pressure to chamber 143, so that the spool is returned to the position shown in FIGURE 1.

By the valve mechanism shown in FIGURE 5, which shows a related form of the invention, the flow of fluid through the valve can be stopped at any time, thereby permitting, for example, a motor controlled by the valve to be stopped and held in any position. This is accomplished by the provision of means for returning and holding the main spool in center position at any time.

With the exceptions to be described, the main body section 12 of the valve shown in FIGURE 5 and the spool 32 mounted therein can be identical to those previously described in relation to FIGURE 1, and corresponding elements are similarly designated. The main spool 32 is shown in its center or neutral position, in which lands 41 and 42 completely close grooves 27 and 29 respectively.

Speed control sections 151 and 152 are mounted at the left and right ends respectively of the body section 12. These sections 151 and 152 may be identical, and it suffices to describe only the elements contained in the right speed control section 152. Corresponding elements of the left section are given similar numbers followed by "L."

Section 152 is secured to the end face of body section 12 by suitable means not shown, and presents a stepped bore or control chamber 153 which is in axial alignment with bore 20 in section 12. A bore 154 communicates with bore 93 of section 12, and a bore 155 intersects bore 154 and opens laterally into bore 153. Another bore 156 intersects bore 154, and this bore 156 communicates with bore 153 through a smaller diameter bore 157. Adjustable needle valve means designated generally by 158 are provided to regulate the rate of flow between bores 156 and 157. The needle valve means are locked in the adjusted position by an acorn nut 159.

A bore 160 parallel to bore 157 also intersects bore 156, and a check valve designated generally by 163 is provided between bore 156 and bore 160 to permit flow from bore 156 to 160 but not in the reverse direction. This check valve 163 may comprise a ball 164 which is urged toward a shoulder in bore 156 by a spring 165. Plugs 166 close the ends of the bores 155 and 156.

The internal chamber 33 in the main pool 32 is closed at its right end by a plug 170 which is seated in a recess 171 therein. A chamber 172 is formed in plug 170, and ports 173 provide communication between the internal chamber 172 of this plug and the control chamber 142 in bore 20 at the right end of spool 32.

A speed control spool 176 is seated in the right end of plug 170 and held therein by a light spring 177. A passage 178 provides communication through spool 176 from chamber 172 to the right end of bore 153.

Spool 176 has circumferential grooves 180, 181, and 182 formed around it at spaced axial positions. These grooves are flanked and separated by lands 183, 184, 185, and 186. Ports 180a, 181a, and 182a provide communication between grooves 180–182 respectively and the interior of spool 176.

A spring 190 bears against a shoulder 191 in bore 153 at one end and against a washer 192 at the other end, urging spool 32 to the left. When the spool 32 is in center position as shown in FIGURE 5, washer 192 rests against a shoulder 193 formed in bore 20 and against the end of spool 32.

The pilot valve 11 of the structure shown in FIGURE 5, is identical to that previously described in relation to FIGURE 1, with the exception that the lands 195 and 196 of the pilot valve spool 115 are so spaced that when the pilot valve spool is in the normal position shown, groove 116 is closed with respect to passages 110 and 111 and those passages are connected to tank through lines 135. Also, two solenoids 197 and 198 are operatively connected to the opposite shafts 121 and 122, solenoid 197 when energized shifting spool 115 to the right, thereby establishing communication between port 112 and passage 111, and passage 110 being connected to tank.

In the structure shown in FIGURE 5 the rate of movement of the main spool is controlled by the rate at which fluid is released from the chamber 153 or 153L which lies in the direction in which the spool is moving; that is, when the spool is moving to the right, its rate of movement is governed by the rate at which fluid is released from chamber 153.

Assuming for purposes of description that the valve shown in FIGURE 5 is connected in a hydraulic circuit similar to that shown in FIGURE 1, to move the piston to extend the ram, solenoid 197 is energized, solenoid 198 being unenergized, and spool 115 is shifted to permit fluid under pressure in passage 112 to flow into passage 111 and through bores 93 and 154 into passage 156, past check valve 163, which opens to permit such flow, and into the chamber 153. This flow is supplemented by fluid from bore 155 whenever grooves 181 and 182 are in communication with it. Thus, under these conditions chamber 153 is supplied at a high rate with fluid under pressure from passage 93.

The rate of movement of the main spool 32 to the left is governed by the rate at which fluid is released from chamber 143 and chamber 153L. Check valve 163L is closed by the pressure in chamber 153L, and does not permit the outflow of fluid through bore 160L. Therefore, fluid can be released from chamber 153L only through needle valve 158L and, when it is open, through port or bore 155L. The sequence of grooves and lands on spool 176L moving past bore 155L as spool 176L moves to the left opens and closes bore 155L in such order that bore 155L is open to permit rapid traverse of the main spool 32 until groove 36 of the spool comes into communication with groove 27, whereupon bore 155L is closed by land 184L; the rate of spool movement is then slowed, by reason of the restriction presented by needle valve 158L, and pressure is applied gradually into port 75 so that the fluid motor controlled by the valve will start without jerking. The rate of spool movement remains slow until groove 36 has come into substantially unrestricted communication with groove 27, whereupon bore 155L is opened by groove 180L, and so on. The rate of spool movement to the right is varied in the same manner. The needle valves 158 and 158L can be adjusted to permit different flow rates, and thereby establish different rates of spool slow traverse in the opposite directions.

Spool 32 can be returned to center position at any time by de-energizing both solenoids 197 and 198, whereupon the spool 115 is returned to neutral position in which passages 93 and 96 are both connected to tank. The fluid pressures at opposite ends of spool 32 then equalize and springs 190 and 190L return the main spool to center position, stopping admission and release of fluid from ports 75 and 76 and preventing further movement of the fluid motor.

While I have described preferred embodiments of my invention, those skilled in the art will realize that the invention may be embodied within other forms all coming within the scope of the following claims:

1. A hydraulically operated valve for controlling the flow of hydraulic liquid under pressure therethrough, said valve including means forming a main pressure inlet port and a main outlet port, a movable main valve means between said main ports for controlling the flow of hydraulic liquid through one of them, means responsive to hydraulic pressure for moving said main valve means to control the flow of hydraulic liquid through one of said main ports, control valve means movable with said main valve means, and separate control port means for hydraulic liquid under pressure, said control valve means cooperating with said control port to cause hydraulic liquid which controls said pressure responsive means to flow at different rates for different main valve means positions, whereby said main valve means will be moved slowly during a critical period of restriction of one of said main ports and rapidly during non-critical periods thereof.

2. A valve for controlling the flow of hydraulic liquid under pressure therethrough and operated by liquid under pressure supplied thereto, said valve having a body and including means forming an inlet port and an outlet port; movable main valve means between said ports for controlling the flow of hydraulic liquid through one of them; expansible and contractable chamber means for hydraulic liquid, the volumetric content of which chamber means is changed to cause movement of said main valve means; a hydraulic liquid metering orifice through which liquid passes to change the volumetric content of said expansible and contractable chamber means; and means forming a control valve through which hydraulic liquid also passes to change the volumetric content of said expansible and contractable chamber means, said control valve including means connected to be moved by movement of said main valve means, said control valve controlling in part the rate of change of the volumetric capacity of said expansible and contractable chamber means and thereby the rate of movement of said main valve means during a critical period of restriction of said one of said ports.

3. A hydraulically operated valve for controlling the flow of hydraulic liquid under pressure therethrough, said valve having a body and including means forming a main pressure inlet port and a main outlet port, movable main valve means between said main ports for controlling the flow of hydraulic liquid through one of them; hydraulic motor means for moving said main valve means to control the flow of hydraulic liquid through one of said main ports, control valve means movable with said main valve means, and separate control means for admitting hydraulic liquid under pressure to said motor means for moving said main valve means, said control valve means cooperating with said control port means to cause hydraulic liquid to be admitted to said hydraulic motor means at different rates for different positions of said main valve means whereby said main valve means will be moved slowly during a critical period of restriction of said one of said main ports and more rapidly during non-critical periods thereof.

4. A hydraulically operated valve for controlling the flow of hydraulic liquid under pressure therethrough, said valve having a body and including means forming an inlet port and an outlet port; movable main valve means between said ports for controlling the flow of hydraulic liquid through one of said ports; expansible and contractable chamber means for hydraulic liquid, the volumetric content of which chamber means changes with movement of said main valve means; means connected to said chamber means for controlling the rate of change in the volumetric capacity of said chamber means and thereby the rate of movement of said main valve means including a permanently open hydraulic liquid metering passageway and a passageway including a control valve means, said control valve means being controlled by the movement and position of said main valve means and being closed during critical periods of restriction of said one of said ports, the rate of movement of said main valve means then being solely under the control of liquid passing through said metering passageway.

5. In a valve mechanism having a pressure port, two outlet ports, and a movable main spool which is axially positionable to control the flow of fluid from said pressure port to said outlet ports, said main spool being positioned with respect to said outlet ports by fluid pressure acting upon a transverse surface thereof in a control chamber, the improvement comprising:

means for changing the rate of movement of said main spool when said main spool is in certain predetermined positions with respect to said outlet ports, said means comprising control valve means in a passage communicating with said control chamber, said control valve means being responsive to the position of said main spool with respect to said outlet ports to permit fluid to flow in said passage at a higher rate when both said outlet ports are open than when one of said outlet ports is being closed and the other is being cracked open by movement of said main spool, and a flow restricting passageway communicating with said control chamber at least when said valve means are closed.

6. In a valve mechanism having a pressure port, two outlet ports, and a movable main spool which is axially positionable to control the flow of fluid from said pressure port to said outlet port, said main spool being positioned with respect to said outlet ports by fluid pressure acting upon a transverse surface thereof in a control chamber, the improvement comprising:

means for changing the rate of movement of said main spool when said main spool is in certain predetermined positions with respect to said outlet ports, said means comprising, pilot valve means for changing the volume of fluid in said control chamber, control valve means in a passage communicating between said pilot valve means and said control chamber, said control valve means being defined in part by a spool and in part by port means fixed relative thereto, said control valve means being responsive to the position of said main spool with respect to said outlet ports by opening to permit fluid to flow in said passage when both said outlet ports are open and closing when one of said outlet ports is being closed and also when one of said outlet ports is being cracked open by movement of said main spool, and a flow restricting passageway communicating with said control chamber at least when said valve means are closed.

7. In a valve mechanism having a pressure port, two outlet ports, and a movable main spool which is axially positionable to control the flow of fluid from said pressure port to said outlet ports, said main spool being positioned with respect to said outlet ports by fluid pressure acting upon a transverse surface thereof in a control chamber, the improvement comprising:

means for changing the rate of movement of said main spool when said main spool is in certain predetermined positions with respect to said outlet to said outlet ports, said means comprising, means for controlling the volume of fluid in said control chamber, said means including a passage communicating with said control chamber, said valve means being defined by and between said spool and port means fixed relative to said spool, said valve means being responsive to the position of said main spool with respect to said outlet ports to open and permit fluid to flow in said passage when both said outlet ports are open and to close when one of said outlet ports is being closed and also to close when one of said outlet ports is being cracked open by movement of said main spool, and a flow restricting passageway including an adjustable needle valve communicating with said control chamber at least when said valve means are closed.

8. In a pilot operated valve mechanism of the type having a body, a main bore in said body, an inlet port and spaced first and second outlet ports communicating with said bore, a main spool shiftable axially in said bore to different flow directing positions therein with respect to said first and second outlet ports, wherein said main spool presents a control surface to a control chamber the pressure in which controls the movement of said main spool, and a pilot valve for shifting said main spool, the improvement comprising:

means for establishing higher and lower rates of flow of fluid into and out of said control chamber at different positions of said main spool with respect to said first and second outlet ports so as to reduce the rate of movement of said main spool in opening and closing said outlet ports relative to its rate of movement at other times and thereby establish more gradual flow through said outlet ports in opening and closing, said means comprising, speed control spool means connected to said main spool, said speed control spool means being slidable in a speed control bore portion of said main bore, a passageway including a flow restrictor communicating with said control chamber, first passageway means laterally entering said speed control bore portion, second passageway means communicating from the surface of said speed control spool means through said spool means, one of said first and second passageway means communicating with said control chamber and another of said first and second passageway means communicating with said pilot valve, said first and second passageway means communicating with each other only at certain positions of said speed control spool means, said certain positions being such that there is no fluid communication of said first and second passageway means except when both said outlet ports are open and when both said outlet ports are closed, but not when one of said outlet ports is opening and not when one of said outlet ports is closing.

9. In a pilot operated valve mechanism of the type having a body, a main bore in said body, an inlet port and spaced first and second outlet ports communicating with said bore, a main spool shiftable axially in said bore to different flow directing positions therein with respect to said first and second outlet ports, and wherein said main spool presents a control surface to a control chamber pressure in which controls the position of said main spool, the improvement comprising:

means for establishing higher and lower rates of flow of fluid into and out of said control chamber at different positions of said main spool with respect to said first and second outlet ports so as to reduce the rate of movement of said main spool in opening and closing said outlet ports relative to its rate of movement at other times and thereby establish more gradual flow through said outlet ports in openings and closing, said means comprising, flow control spool means at one end of said main spool, said flow control spool means being slidable in a flow control bore portion of said main bore, a first passageway including a flow restrictor communicating with said control chamber, a second passageway laterally entering said flow control bore portion, and a plurality of flow control ports opening at spaced axial positions on said flow control spool means and communicating internally therethrough with said control chamber, said flow control ports communicating sequentially with said second passageway as said flow control spool means shifts, the positions of said flow control ports being such that there is no fluid communication with said control chamber except through said flow restrictor when the rate of flow of fluid through one of said outlet ports is substantially changing in response to movement of said main spool, said second passageway communicating with said control chamber through at least one of said flow control ports at all other times.

10. A pilot operated valve mechanism comprising a body, a main bore in said body, an inlet port and spaced first and second outlet ports communicating with said bore, a main spool shiftable axially in said bore to different flow directing positions therein with respect to said first and second outlet ports, said main spool presenting opposed control surfaces to opposed control chambers, a pressure differential between which controls the position of said main spool, a pilot valve for selectively applying pressure to said control chambers, said pilot valve having a pair of pilot ports, flow control spool means at each end of said main spool, each said flow control spool means being slidable in a corresponding flow control bore portion of said main bore, passages each including a flow restrictor communicating between each pilot port and said control chambers, said passages also each including a flow restrictor by-pass check valve permitting flow into the corresponding chambers but not in the opposite direction, a passageway between each said passage and the corresponding control chamber, each said passageway including valve means defined by each said flow control spool means and the corresponding bore portion, each said valve means opening to permit flow therethrough into the corresponding control chamber when said outlet ports are open and also opening when said outlet ports are closed, but closing when any of said outlet ports is being opened and also when any of said outlet ports is being closed.

11. In a pilot operated valve mechanism having a pressure port, two outlet ports, and a movable main spool which is axially positionable to control the flow of fluid from said pressure port to said outlet ports, said main spool being positioned with respect to said outlet ports by fluid pressure acting upon a transverse surface thereof in a control chamber, the improvement comprising:

means for changing the rate of movement of said main spool when said main spool is in certain predetermined positions with respect to said outlet ports, said means comprising, a speed control spool connected to said main spool and being movable therewith, means defining a bore in which said speed control spool slides as said main spool moves, a passage entering said bore in the side surface thereof, a series of control ports in the side surface of said speed control spool each forming a valve with said passage at a different axial position of said speed control spool, said control ports all communicating with said control chamber through said speed control spool, flow restricting means constantly communicating with said control chamber, the positions of said control ports in said speed control spool being so related to the position at which said main spool opens and closes each of said outlet ports that said speed control ports are in substantially unrestricted communicaiton with said passage when both said outlet ports are open and when both said outlet ports are closed, and such that said speed control ports are not in unrestricted communication with said passage when said main spool is opening any of said outlet ports and when said main spool is closing any of said outlet ports.

12. In a pilot operated valve mechanism having a pressure port, two outlet ports, and a movable main spool which is axially positionable to control the flow of fluid from said pressure port to said outlet ports, said main spool being positioned with respect to said outlet ports by fluid pressure acting upon a transverse surface thereof in a control chamber, the improvement comprising:

means for changing the rate of movement of said main spool when said main spool is in certain predetermined positions with respect to said outlet ports, said means comprising, a speed control spool connected to said main spool and moving therewith, means defining a bore in which said speed control spool slides as said main spool moves, passage means communicating through said speed control spool with said control chamber and through which fluid can flow to change the volume of fluid in said control chamber, said passage means including a plurality of valves connected in parallel relation governing the flow of fluid through said passage means, each of said valves being defined by said speed control spool and said bore, at least one of said valves being open to permit flow therethrough in said passage means when both said outlet ports are substantially open, said valves closing said passage means to the flow of fluid therethrough when said main spool is cracking open one of said outlet ports and also when said main spool is substantially closing one of said outlet ports, and secondary passage means constantly communicating with said control chamber including a restricted orifice reducing the rate of flow therethrough.

13. In a pilot operated valve mechanism having a pressure port, two outlet ports, a movable main spool which is axially positionable to control the flow of fluid from said pressure port to said outlet ports, said main spool being positioned with respect to said outlet ports by fluid pressure acting upon a transverse surface thereof in a control chamber, and a pilot valve for applying pressure in said pressure chamber, the improvement comprising:

means for changing the rate of movement of said main spool when said main spool is in certain predetermined positions with respect to said outlet ports, said means comprising, a speed control spool connected to said main spool and being movable therewith, means defining a bore in which said speed control spool slides as said main spool moves, a passage between said pilot valve and said bore, said passage opening into said bore through the side surface thereof, a series of grooves in the side surface of said speed control spool each forming a valve with said passage at a different axial position of said speed control spool, said grooves being connected to a passageway communicating with said control chamber through said speed control spool, a passageway between said pilot valve and said control chamber including a flow restrictor, the positions of said grooves around said speed control spool being so related to the position at which said passage opens into said bore that one of said grooves is in communication with said passage when both said outlet ports are open and when both said outlet ports are closed, and such that none of said grooves is in unrestricted communication with said passage when said main spool is opening any of said outlet ports and when said main spool is closing any of said outlet ports.

References Cited by the Examiner

UNITED STATES PATENTS

| | | | |
|---|---|---|---|
| 2,355,434 | 8/1944 | Harter | 137—625.63 |
| 2,771,907 | 11/1956 | Joy | 137—625.63 X |
| 2,955,617 | 10/1960 | Collins | 137—625.63 |
| 3,015,317 | 1/1962 | Buchanan et al. | 137—625.63 X |

M. CARY NELSON, *Primary Examiner.*

H. KLINKSIEK, *Assistant Examiner.*